(12) United States Patent
Vannod et al.

(10) Patent No.: US 11,392,090 B2
(45) Date of Patent: Jul. 19, 2022

(54) MAINSPRING FOR A MOVEMENT OF A TIMEPIECE AND METHOD FOR MANUFACTURING THE SAME

(71) Applicant: Nivarox-FAR S.A., Le Locle (CH)

(72) Inventors: Jonas Vannod, Bienne (CH); Christian Charbon, Chezard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 865 days.

(21) Appl. No.: 16/210,011

(22) Filed: Dec. 5, 2018

(65) Prior Publication Data

US 2019/0187616 A1 Jun. 20, 2019

(30) Foreign Application Priority Data

Dec. 15, 2017 (EP) .................................... 17207752

(51) Int. Cl.
| | | |
|---|---|---|
| *G04B 1/14* | (2006.01) | |
| *G04B 1/18* | (2006.01) | |
| *B33Y 80/00* | (2015.01) | |
| *F16F 1/12* | (2006.01) | |
| *B33Y 10/00* | (2015.01) | |
| *F16F 1/10* | (2006.01) | |

(52) U.S. Cl.
CPC .............. *G04B 1/145* (2013.01); *B33Y 10/00* (2014.12); *B33Y 80/00* (2014.12); *F16F 1/121* (2013.01); *G04B 1/14* (2013.01); *G04B 1/18* (2013.01); *F16F 1/10* (2013.01); *F16F 2226/00* (2013.01)

(58) Field of Classification Search
CPC . G04B 1/14; G04B 1/145; G04B 1/16; G04B 1/18; G04B 17/32; G04D 3/0074; G04D 3/0076
See application file for complete search history.

(56) References Cited

U.S. PATENT DOCUMENTS

| | | | | |
|---|---|---|---|---|
| 2013/0283615 A1* | 10/2013 | Kaelin | ...................... | G04B 1/18 |
| | | | | 29/896.31 |
| 2014/0027205 A1 | 1/2014 | Charbon | | |
| 2014/0211596 A1* | 7/2014 | Kaelin | ...................... | G04B 1/16 |
| | | | | 368/142 |
| 2015/0092523 A1* | 4/2015 | Bertrand | ................... | G04B 1/14 |
| | | | | 368/142 |

FOREIGN PATENT DOCUMENTS

| | | |
|---|---|---|
| CH | 704 237 A2 | 6/2012 |
| CH | 706 653 A2 | 12/2013 |
| CN | 103502678 A | 1/2014 |
| CN | 203669018 U | 7/2014 |
| CN | 104412175 A | 3/2015 |

(Continued)

OTHER PUBLICATIONS

Translation of CH706653A2 (Year: 2021).*

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A mainspring includes a spiral metal strip and a hooking area formed in an inner face of an inner end of the strip, the hooking area including at least one shaped portion and at least one cavity in the inner face of the inner end.

16 Claims, 3 Drawing Sheets

(56) References Cited

FOREIGN PATENT DOCUMENTS

| EP | 2 520 821 A1 | 11/2012 |
| JP | 2014-190816 A | 10/2014 |
| JP | 2015-519578 A | 7/2015 |
| JP | 2017-142215 A | 8/2017 |

OTHER PUBLICATIONS

Combined Chinese Office Action and Search Report dated Jan. 18, 2021 in Chinese Patent Application No. 201811524231.7 (with partial English translation of Office Action), 16 pages.
European Search Report dated May 22, 2018 in European Application 17207752.1 filed on Dec. 15, 2017 (with English Translation of Categories of Cited Documents & Written Opinion).
Korean Office Action dated Nov. 11, 2020 in Korean Patent Application No. 10-2018-0161966 (with English translation), 6 pages.
Korean Office Action dated Jan. 15, 2021 in Korean Patent Application No. 10-2018-0161966 (with English translation), 11 pages.

\* cited by examiner

MAINSPRING FOR A MOVEMENT OF A TIMEPIECE AND METHOD FOR MANUFACTURING THE SAME

CROSS-REFERENCE TO RELATED APPLICATION

This application claims priority to European Patent Application No. 17207752.1 filed on Dec. 15, 2017, the entire disclosure of which is hereby incorporated herein by reference.

FIELD OF THE INVENTION

The invention concerns both a method for manufacturing a mainspring for a timepiece movement and the mainspring.

The invention also concerns the timepiece movement provided with such a mainspring as well as the timepiece that includes such a timepiece movement.

BACKGROUND OF THE INVENTION

In the state of the art, methods for manufacturing a mainspring for a timepiece movement traditionally include an initial step of forming a metal spring including a sub-step of obtaining a metal wire by a wire drawing process and a sub-step of rolling the wire obtained. Such methods generally include a separate step of making a rectangular opening (known as a 'hole') in an inner end of the strip, said opening being arranged to cooperate with a hook of a median cylindrical part known as the barrel arbor 'core' of the movement. These methods then include a step of making an eye or loop forming the first turn around the barrel arbor in order to allow the spring to be mounted on the latter.

However, such methods only allow mainsprings to be made from a limited number of materials. Indeed, these methods are not suitable, for example, for manufacturing mainsprings formed from electroplated materials. There therefore exists a need to develop mainspring manufacturing methods that do not have these drawbacks.

SUMMARY OF THE INVENTION

It is an object of the present invention to overcome all or part of the aforementioned drawbacks by proposing a method for manufacturing a mainspring provided with an original hooking area that participates in the three dimensional formation of such a part with manufacturing complexity due, in particular, to its small dimensions and/or its particular shape, using a large variety of materials.

To this end, the invention concerns a method for manufacturing a mainspring for a movement of a timepiece including a step of producing a spiral metal strip and a hooking area on an inner face of an inner end of said strip, the hooking area including at least one shaped portion and/or at least one cavity, said production step being devoid of any rolling phase and/or any stamping phase.

In other embodiments:
the production step includes a sub-step of forming the spiral metal strip and the hooking area by electroforming;
said forming sub-step includes:
a phase of creating, by photolithography, a mould including at least one level on a substrate;
a phase of filling said at least one level of the mould by electrodeposition of a metal material, and
a phase of releasing the strip from the mould including the hooking area and from the substrate to form the mainspring;
a sub-step of forming the spiral metal strip and the hooking area by material removal from a metal substrate in the form of a wafer;
the material removal is achieved by techniques of photolithography and/or engraving/chemical etching and/or laser cutting and/or DRIE etching;
the production step includes a sub-step of forming the spiral metal strip and the hooking area by a metal additive manufacturing technique.

The invention also concerns a mainspring for a movement of a timepiece that can be obtained by the method.

In other embodiments:
this spring includes a spiral metal strip and a hooking area formed in an inner face of an inner end of said strip, the hooking area has at least one shaped portion and/or at least one cavity comprised in said inner face of said inner end;
the inner end has a first inner coil including said hooking area;
the inner end has a fixed core including said hooking area;
the cavity has a base and side walls, said side walls each forming an acute angle with said base;
the cavity has a depth that is substantially greater or strictly greater than half the thickness of the strip.

The invention also concerns a movement of a timepiece including such a mainspring.

Advantageously, the timepiece movement includes a barrel arbor provided with a peripheral wall having a connecting area including at least one shaped portion and/or at least one cavity able to cooperate with at least one cavity and/or at least one shaped portion of the hooking area of the mainspring assisting in holding said mainspring on said barrel arbor.

In particular, in this timepiece movement:
the cavity in the connecting area is able to cooperate with the shaped portion of the hooking area and/or
the shaped portion of the connecting area is able to cooperate with the cavity of the hooking area.

The invention also concerns a timepiece including such a timepiece movement.

Thus, as a result of these features, the manufacturing method makes it possible to make mainsprings from a large variety of materials and especially materials that cannot withstand rolling and/or stamping processes, especially as regards forming the hooking area of said springs which requires very high precision owing, in particular, to the small dimensions and/or specific shape thereof.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
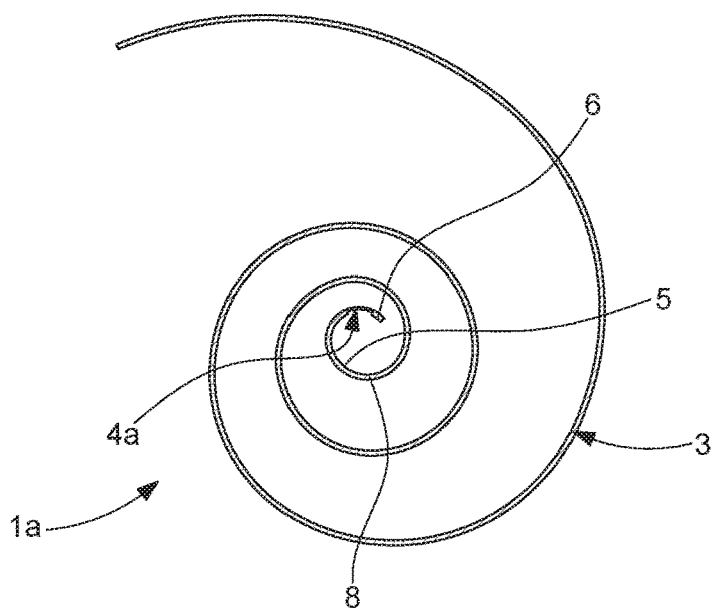
FIG. 1 is a schematic representation of a mainspring for a movement of a timepiece according to a first embodiment of the invention.

Referring to FIGS. 1 to 7 and 9, the invention concerns a mainspring 1a, 1b, 1c, 1d, 1e of a timepiece movement 1000 of a timepiece 100, such as a watch. Such a mainspring 1a, 1b, 1c, 1d, 1e is able to cooperate with a barrel arbor 2 of timepiece movement 1000, since it is hooked thereto at its inner end 6. Indeed, in various embodiments of the invention described below, a first inner coil 8 or a fixed core 9 of mainspring 1a, 1b, 1c, 1d, 1e forms an eye or loop which is essentially annular in shape and which is arranged to be hooked to a connecting area formed on a core of barrel arbor 2.

In the first to fifth embodiments of this mainspring 1a, 1b, 1c, 1d, 1e visible in FIGS. 1 to 7, mainspring 1a, 1b, 1c, 1d, 1e is a one-piece component which includes a spiral metal strip 3, otherwise referred to as strip 3, wound around itself, and a hooking area 4a, 4b, 4c, 4d, 4e. This strip 3 includes an inner end 6 in which hooking area 4a, 4b, 4c, 4d, 4e is formed. This hooking area 4a, 4b, 4c, 4d, 4e is arranged on an inner face 5 of inner end 6 and includes at least one shaped portion 7a and/or at least one cavity 7b.

Figure 2:
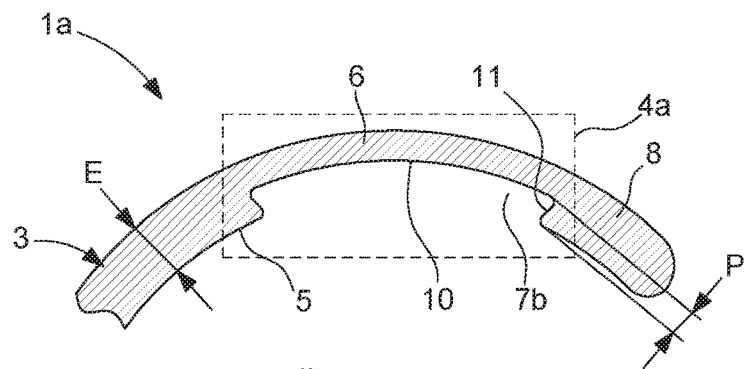
FIG. 2 is a schematic representation of an inner end of the mainspring including a first inner coil provided with a hooking area including a cavity according to the first embodiment of the invention.
Figure 3:
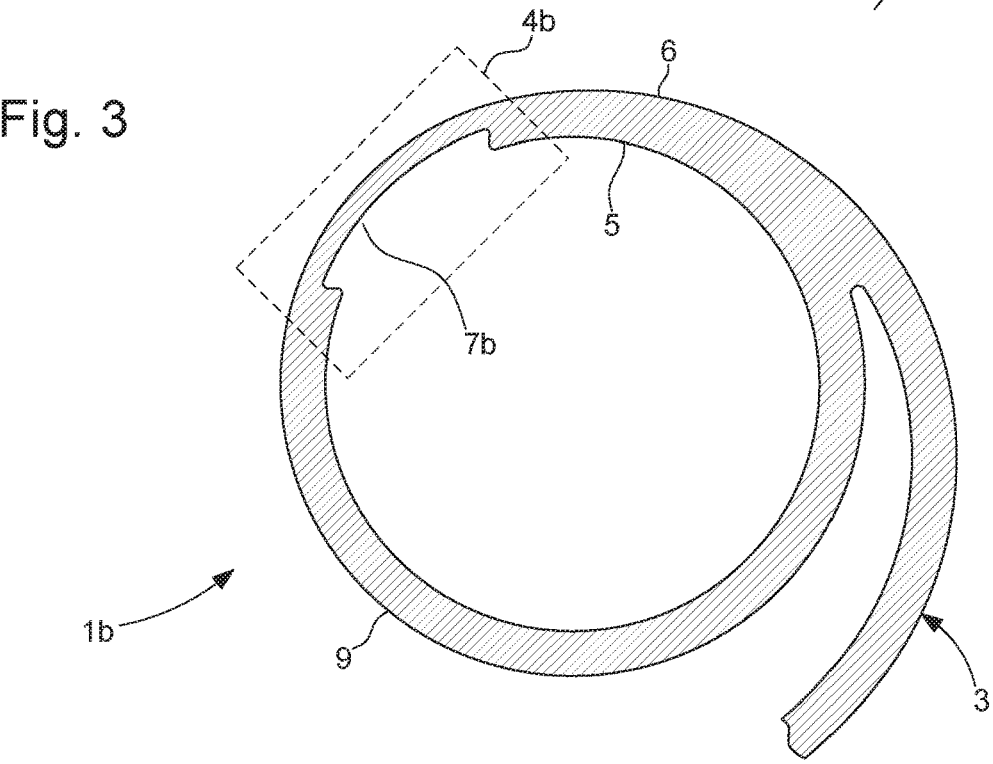
FIG. 3 is a schematic representation of an inner end of the mainspring including a fixed core provided with a hooking area including a cavity according to a second embodiment of the invention.

More specifically, in the first embodiment of the mainspring 1a visible in FIGS. 1 and 2, inner end 6 includes a first inner coil 8 including said hooking area 4a provided with a single cavity 7b. In FIG. 3 illustrating the second embodiment of this mainspring 1b, inner end 6 includes a fixed core 9 including said hooking area 4b also provided with a single cavity 7b. In these two embodiments, cavity 7b is integral with strip 3. Cavity 7b has a base 10 and side walls 11, said side walls 11 each preferably form an acute angle with said base 10. In this configuration, cavity 7b has a depth P which is substantially greater than or strictly greater than half the thickness E of said strip 3. It will also be noted that base 10 of cavity 7b is integral with strip 3.

Figure 4:
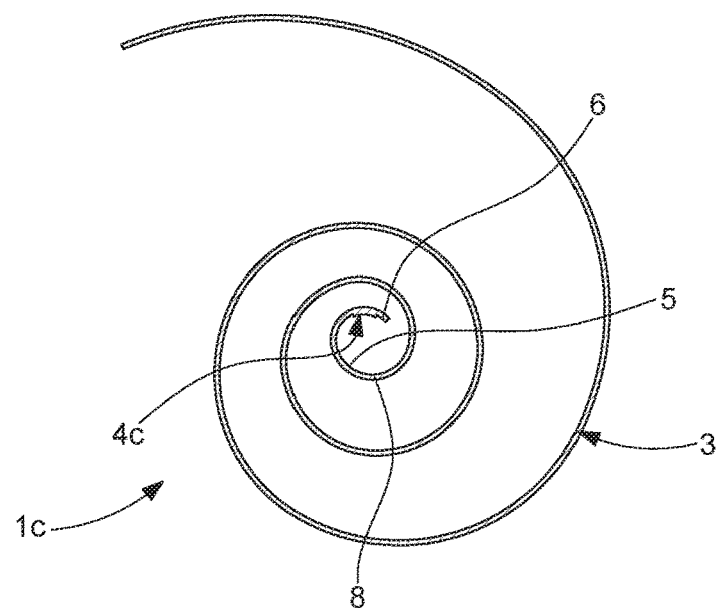
FIG. 4 is a schematic representation of a mainspring for a movement of a timepiece according to a third embodiment of the invention.
Figure 5:
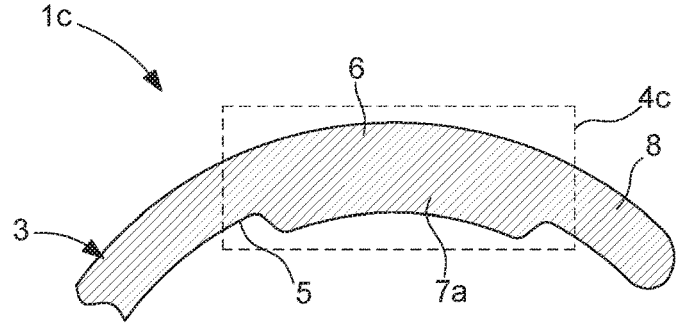
FIG. 5 is a schematic representation of an inner end of the mainspring including a first inner coil provided with a hooking area including a shaped portion according to the third embodiment of the invention.
Figure 6:
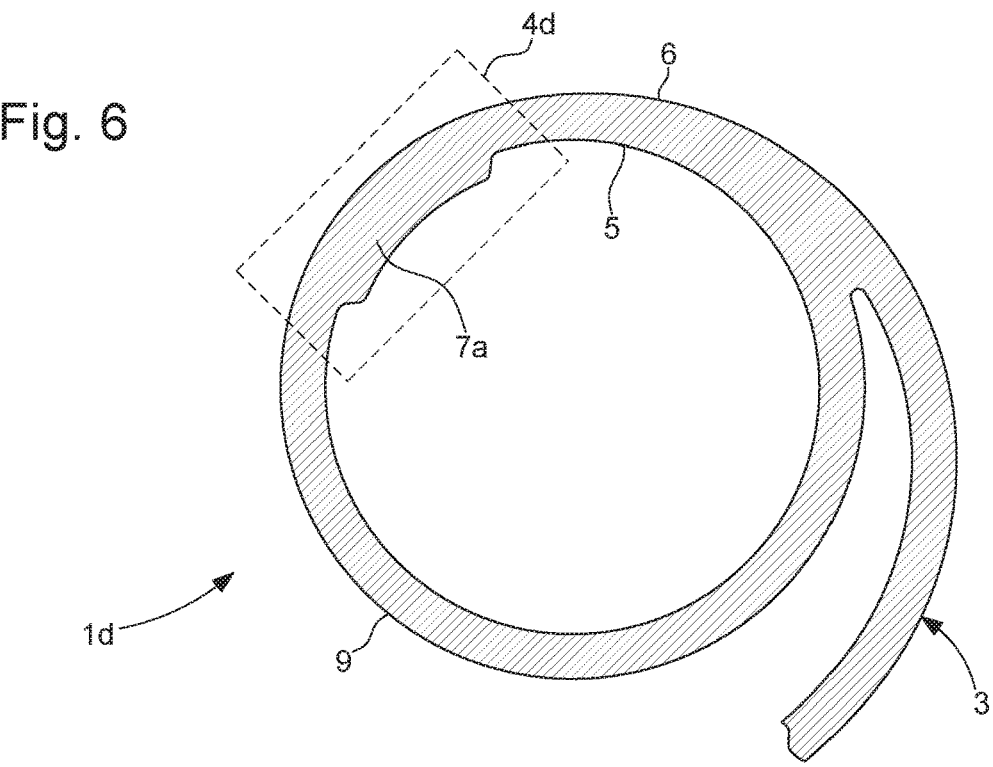
FIG. 6 is a schematic representation of an inner end of the mainspring including a fixed core provided with a hooking area including a shaped portion according to a fourth embodiment of the invention.

In the third embodiment of the mainspring 1c visible in FIGS. 4 and 5, inner end 6 has a first inner coil 8 including said hooking area 4c provided with a single shaped portion 7a. In the fourth embodiment of said mainspring 1d visible in FIG. 6, inner end 6 has the aforementioned fixed core 9, which includes said hooking area 4 also provided with a single shaped portion 7a. In these two embodiments, shaped portion 7a is a portion of increased thickness over an inner face 5 of inner end 6 of strip 3. As seen in FIGS. 4 to 7, this shaped portion 7a extends radially with a substantially uniform thickness towards the centre of first inner coil 8 or of fixed core 9 depending on the embodiment concerned.

Figure 7:
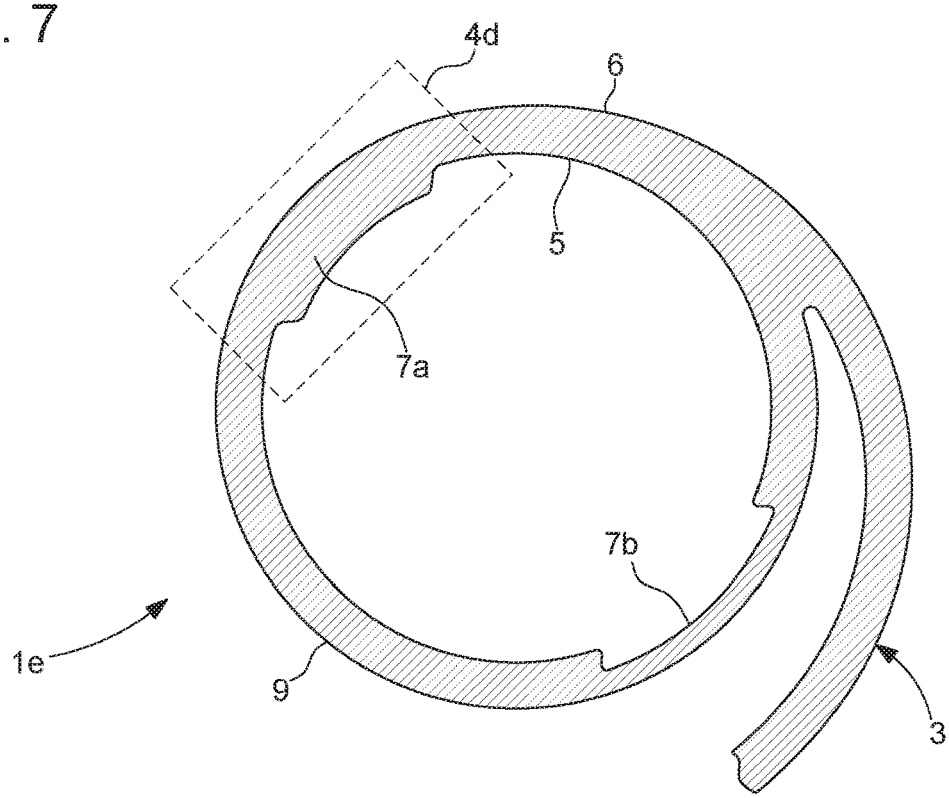
FIG. 7 is a schematic representation of an inner end of the mainspring including a fixed core provided with a hooking area including a cavity and a shaped portion according to a fifth embodiment of the invention.

In the fifth embodiment of said mainspring 1e illustrated in FIG. 7, inner end 6 of mainspring 1e includes a fixed core 9 provided with a hooking area 4e including a cavity 7b and a shaped portion 7a.

In the first and third embodiments, it will be noted that shaped portion 7a and cavity 7b are each formed immediately adjacent to the free end of first inner coil 8. In this configuration, the free end of first inner coil 8 has substantially the same cross-section as the rest of said first inner coil 8. This cross-section has a surface area which is greater than that of cavity 7b and smaller than the surface area of the cross-section of shaped portion 7a.

In the second, fourth and fifth embodiments of said mainspring 1b, 1d, 1e, fixed core 9 may be a collet integral with strip 3 and intended to cooperate, for example, with a barrel arbor core or more generally a pivoting arbor such as barrel arbor 2.

In these various embodiments of mainspring 1a, 1b, 1c, 1d, 1e, hooking area 4a, 4b, 4c, 4d, 4e can include a plurality of cavities 7b or of shaped portions 7a, or a combination of cavities 7b and shaped portions 7a. Cavities 7b and/or shaped portions 7a of said plurality and of said combination are arranged on inner face 5 of inner end 6 of mainspring 1a, 1b, 1c, 1d, 1e and, in particular, over all or part of said inner face 5 formed in first inner coil 8 or in fixed core 9 depending on the embodiment concerned.

Further, it is thus understood that any pitfalls caused by the small dimensions of hooking area 4a, 4b, 4c, 4d, 4e provided with at least one cavity 7b and/or at least one shaped portion 7a, are avoided by the one-piece structure of this spring 1a, 1b, 1c, 1d, 1e. In addition, it will be noted that this hooking area 4a, 4b, 4c, 4d, 4e is always perfectly positioned with respect to the strip of mainspring 1a, 1b, 1c, 1d, 1e. This hooking area 4a, 4b, 4c, 4d, 4e is integral with strip 3 and is intended to cooperate, for example, with the connecting area of the core of barrel arbor 2. This structure makes it possible to be very precise as to the dimensions of hooking area 4a, 4b, 4c, 4d, 4e, i.e. as to the dimensions of cavity 7b or of shaped portion 7a, and as to its position on inner end 6 of strip 3.

Thus, as already mentioned, barrel arbor 2 of timepiece movement 1000 has a core whose peripheral wall is provided with the connecting area. This connecting area, which necessarily has a complementary shape to that of hooking area 4a, 4b, 4c, 4d, 4e, is specifically arranged to cooperate with such a hooking area 4a, 4b, 4c, 4d, 4e of mainspring 1a, 1b, 1c, 1d, 1e, for the removable attachment/assembly of mainspring 1a, 1b, 1c, 1d, 1e to barrel arbor 2. Indeed, this connecting area also includes at least one shaped portion and/or at least one cavity able to cooperate, particularly by interlocking or snap fit with at least one cavity 7b and/or at least one shaped portion 7a of mainspring 1a, 1b, 1c, 1d, 1e, thereby assisting in holding mainspring 1a, 1b, 1c, 1d, 1e on barrel arbor 2. By way of example, the shaped portion of the connecting area is able to cooperate with cavity 7b of hooking area 4a, 4b, 4c, 4d, 4e, since said cavity 7b has a complementary shape to that of said shaped portion. Likewise, the connecting area cavity is able to cooperate with shaped portion 7a of hooking area 4a, 4b, 4c, 4d, 4e, since said shaped portion 7a has a complementary shape to that of said cavity.

Figure 8:
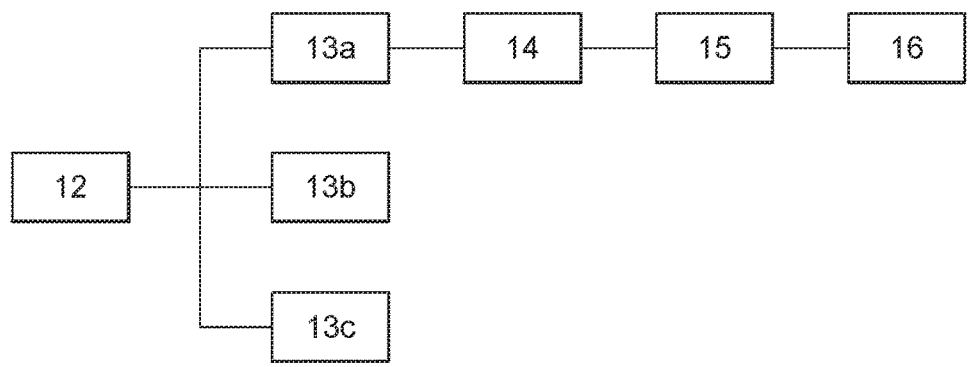
FIG. 8 is a logic diagram relating to a method for manufacturing the mainspring.
Figure 9:
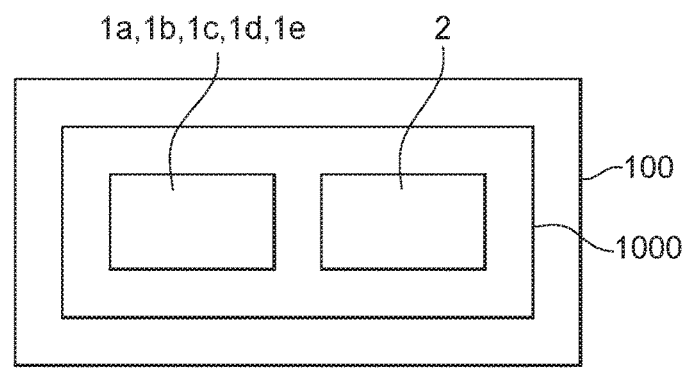
FIG. 9 is a schematic representation of a timepiece including the timepiece movement provided with one of the first to fifth embodiments of the mainspring cooperating with a barrel arbor.

Referring to FIG. 8, the invention also concerns a method for manufacturing said mainspring 1a, 1b, 1c, 1d, 1e, including a step 12 of producing spiral metal strip 3 and hooking area 4a, 4b, 4c, 4d, 4e that includes at least shaped portion 7a and/or at least cavity 7b. This production step 12 participates, substantially simultaneously or simultaneously, in the formation of strip 3 and of hooking area 4a, 4b, 4c, 4d, 4e formed in inner face 5 of inner end 6 of said strip 3. In this method, this step 12 of producing mainspring 1a, 1b, 1c, 1d, 1e does not include a rolling phase and/or a stamping phase.

In a first variant of this method, production step 12 includes a sub-step 13a of forming spiral metal strip 3 and hooking area 4a, 4b, 4c, 4d, 4e by electroforming. In sub-step 13a, the main electroforming steps consist in forming a mould and then filling the mould with a material, for example, by a galvanoplastic process. This type of electroforming is known by the "abbreviation L.I.G.A". from the German term "ROntgenlithographie, Galvanoformung, Abformung". More specifically, this sub-step 13a includes an initial phase 14 consisting in providing a substrate having an electrically conductive upper layer. This layer may be obtained by depositing an electrically conductive material on an insulating material or by the fact that the substrate is formed of an electrically conductive material. Thereafter, sub-step 13a includes a phase 15 of creating, by photolithography, the mould including at least one level on a substrate. Depending on the type of L.I.G.A process, the mould may actually have only one level which is completely formed before being filled, or several levels so that each level of the mould is then formed and filled before moving onto the next level. Of course, any type of electroforming process (L.I.G.A or otherwise) capable of forming a one-piece mainspring 1a to 1e having at least one level may be envisaged. It will be noted that, in this mould-creating phase 15, the single mould level is formed, for example, by photolithography using a resin. In addition, there is formed inside this mould at least one cavity whose shaped portion corresponds to the pattern of the future mainspring 1a, 1b, 1c, 1d, 1e, i.e. with its hooking area 4a, 4b, 4c, 4d, 4e incorporated in inner face 5 of the first coil or of fixed core 9 depending on the embodiment concerned of mainspring 1 a to 1e. In this first variant, sub-step 13a of the method then includes a phase 16 of filling the level of the mould by electrodeposition of a metal material. In this phase 16, said at least one cavity of corresponding shape to the pattern of future mainspring 1a, 1b, 1c, 1d, 1e is then filled with said metal material. Thereafter, sub-step 13a includes a phase 17 of releasing strip 3, provided with hooking area 4a, 4b, 4c, 4d, 4e, from the mould, and from the substrate in order to form mainspring 1a, 1b, 1c, 1d, 1e. Preferably according to the invention, the metal material deposited is a nickel and phosphorus alloy, typically with substantially 12% of phosphorus (NiP12). Indeed, it was found satisfactory to use this type of alloy for manufacturing a mainspring because it has a modulus of elasticity of around 90 GPa and an elastic limit of around 1700 MPa.

In a second variant of this method, production step 12 includes a sub-step 13b of forming spiral metal strip 3 and hooking area 4a, 4b, 4c, 4d, 4e by material removal from a metal substrate in the form of a wafer. In this context, material removal is achieved by techniques of photolithography and/or engraving/chemical etching and/or laser cutting. In addition, DRIE ('Deep reactive ion etching') techniques can also be used in sub-step 13b, especially when the metal strip to be formed is made of a material like silicon or certain ceramics. In sub-step 13b, strip 3 and hooking area 4a, 4b, 4c, 4d, 4e are cut out from a common metal substrate. The substrate from which material is removed can be made of a single material, for example silicon, or any other deformable material that those skilled in the art deem suitable for this mainspring application. For example, the substrate can be made of silicon oxide, quartz or one of their compounds, of microcystalline material, and/or a combination of these materials. In a variant, the substrate includes two or more layers of different materials. In another variant, the substrate is hollow. Preferably, it will be noted that the substrate is ideally plane. In a variant, the common substrate can be extruded to create three-dimensional topologies. In another variant, the mainspring 1a, 1b, 1c, 1d, 1e is formed from a multi-layered substrate, with layers formed from several materials or from the same material.

In a third variant of this method, production step 12 includes a sub-step 13c of forming spiral metal strip 3 and hooking area 4a, 4b, 4c, 4d, 4e by a metal additive manufacturing technique. This metal additive manufacturing technique for example implements known state of the art technologies, which will not, therefore, be described in detail here, such as for example:

a selective laser melting/sintering process (SLM/SLS),
a laser metal deposition process (LMD), or
an electron beam melting process (EBM).

It is clear therefore that in these different variants, this manufacturing method does not provide separate steps for making strip 3 forming mainspring 1a, 1b, 1c, 1d, 1e and cavity 7b and/or shaped portion 7a of hooking area 4a, 4b, 4c, 4d, 4e of said mainspring 1a à 1e. Indeed, cavity 7b and/or shaped portion 7a are formed immediately at substantially the same time or at the same time as strip 3 of mainspring 1a to 1e. Depending on the desired embodiments, this advantage is obviously valid for fixed core 9 including hooking area 4a, 4b, 4c, 4d, 4e. In this context, cavity 7b and/or shaped portion 7a of hooking area 4a, 4b, 4c, 4d, 4e are always perfectly structurally positioned with respect to strip 3.

The invention claimed is:

1. A method for manufacturing a mainspring for a movement of a timepiece, comprising:
   producing a spiral metal strip and a hooking area on an inner face of an inner end of said strip, the hooking area including at least one shaped portion and at least one cavity, the at least one shaped portion having a protruding shape complementary to the cavity, wherein
   said producing is devoid of rolling and/or stamping.

2. The method according to claim 1, wherein the producing comprises forming the spiral metal strip and the hooking area by electroforming.

3. The method according to claim 2, wherein the forming comprises:
   creating, by photolithography, a mould including at least one level on a substrate;
   filling said at least one level of the mould by electrodeposition of a metal material; and
   releasing the strip from the mould including the hooking area and from the substrate to form the mainspring.

4. The method according to claim 1, wherein the producing comprises of forming the spiral metal strip and the hooking area by material removal from a metal substrate in the form of a wafer.

5. The method according to claim 1, wherein material removal is achieved by techniques of photolithography and/or engraving/chemical etching and/or laser cutting and/or DRIE etching.

6. The method according to claim 1, wherein the producing comprises forming the spiral metal strip and the hooking area by a metal additive manufacturing technique.

7. A mainspring for a movement of a timepiece obtainable by the method according to claim 1.

8. The mainspring according to claim 7, wherein the mainspring comprises the spiral metal strip and the hooking area formed in the inner face of the inner end of said strip.

9. The mainspring according to claim 7, wherein the inner end comprises a first inner coil including said hooking area.

10. The mainspring according to claim 7, wherein the inner end comprises a fixed core including said hooking area.

11. The mainspring according to claim 7, wherein the cavity comprises a base and side walls, said side walls each forming an acute angle with said base.

12. The mainspring according to claim 7, wherein the cavity has a depth which is substantially greater or strictly greater than half a thickness of the strip.

13. A timepiece movement for a timepiece comprising the mainspring according to claim 7.

14. The timepiece movement according to claim 13, wherein the movement comprises a barrel arbor provided with a peripheral wall including a connecting area including the at least one shaped portion and/or the at least one cavity able to cooperate with the at least one cavity and/or the at least one shaped portion of the hooking area of the mainspring assisting in holding said mainspring on said barrel arbor.

15. The timepiece movement according to claim 13, wherein:
the cavity in a connecting area is able to cooperate with the shaped portion of the hooking area, and/or
the shaped portion of the connecting area is able to cooperate with the cavity of the hooking area.

16. A timepiece comprising the timepiece movement according to claim 13.

* * * * *